United States Patent [19]

Corbett

[11] 4,356,356

[45] Oct. 26, 1982

[54] HEADSET/GROUNDCORD TESTER APPARATUS

[76] Inventor: Martin E. Corbett, 5209 APO, New York, N.Y. 09179

[21] Appl. No.: 188,411

[22] Filed: Sep. 18, 1980

[51] Int. Cl.³ .................... H04M 3/22; H04R 29/00
[52] U.S. Cl. ........................................... 179/175.1 R
[58] Field of Search ......... 179/175, 175.1 R, 175.1 A, 179/175.2 R, 175.25, 175.3 F, 175.3 R; 324/51; 340/651

[56] References Cited

U.S. PATENT DOCUMENTS 3,594,517  7/1971  Woodruff et al. ............. 179/175.25
4,110,571  8/1978  Hills ............................ 179/175.1 A Primary Examiner—Thomas A. Robinson
Attorney, Agent, or Firm—Donald J. Singer; William Stepanishen

[57] ABSTRACT

A test set for checking headsets and groundcords utilizing an internally generated electrical signal to determine the state of individual wires by means of a visual indication. The headset is powered by the test set to enable the test set operator to speak into the headset microphone and hear the results in the earpiece.

5 Claims, 1 Drawing Figure

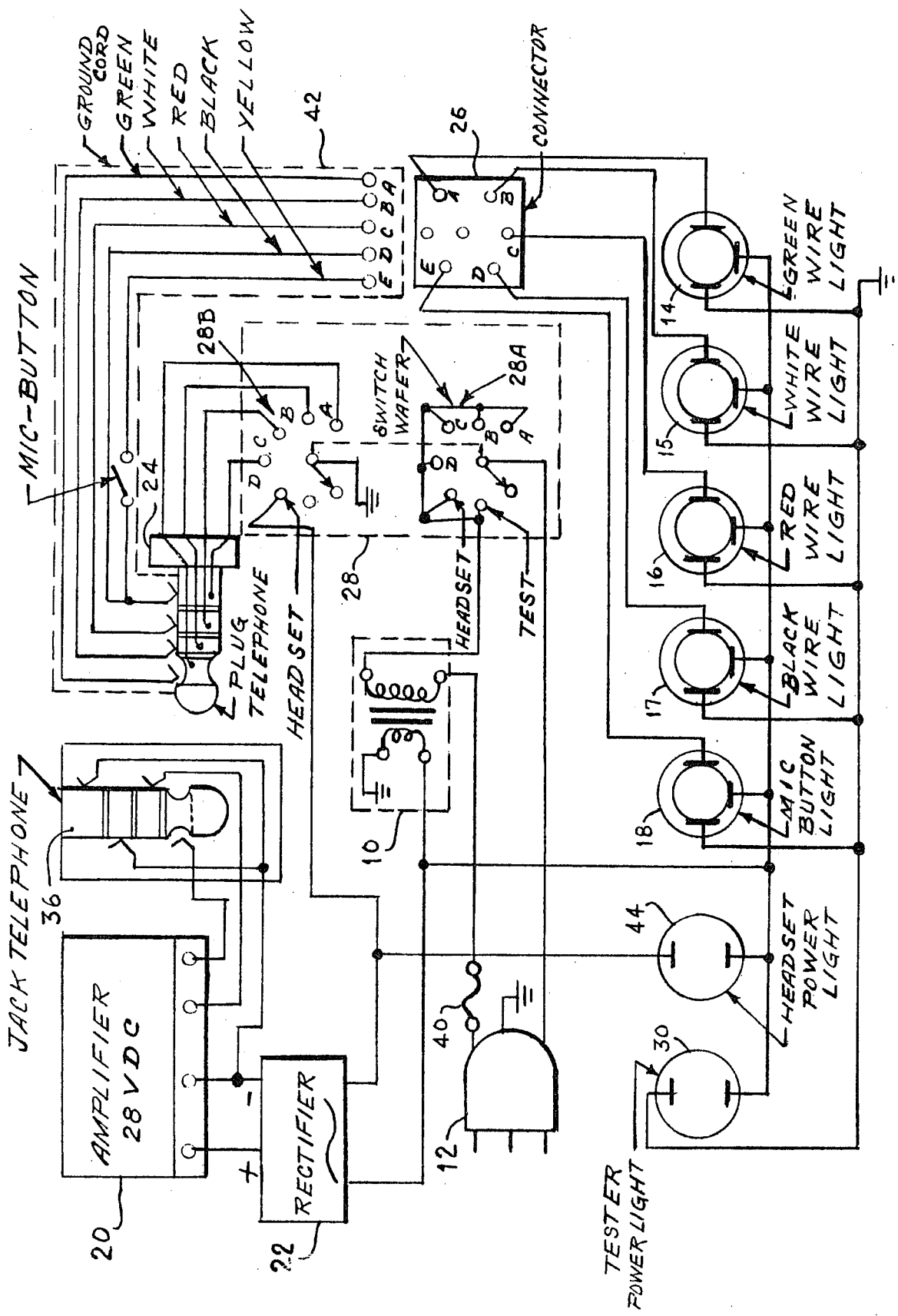

HEADSET/GROUNDCORD TESTER APPARATUS

STATEMENT OF GOVERNMENT INTEREST

The invention described herein may be manufactured and used by or for the Government for governmental purposes without the payment of any royalty thereon.

BACKGROUND OF THE INVENTION

The present invention relates broadly to a test set apparatus, and in particular to a headset/groundcord test set apparatus.

In the prior art, the electrical conductors in wiring harnesses and cables may be tested by having the equipment disconnected from the power source. An ohm meter is then used to measure the continuity from one end of the conductor to the other end and also to make sure that there is no continuity between either end of the conductor and any other conductor in the cable or harness. A continuity check is made from both ends of the conductor under test to the cable end plugs and chassis ground. Thus, it may be clearly seen that prior art methods of making the above electrical checks require tedious and time consuming manual operations which are subject to human error. Certain prior automatic or semiautomatic equipment has been devised to perform these functions, but for one reason or another they have been found to be unsatisfactory. In addition, they are rather cumbersome, involve complex circuitry, have rather complex methods of operation, and are difficult to calibrate and repair in the field.

SUMMARY OF THE INVENTION

The present invention utilizes an internal power supply means in conjunction with a plurality of indicator lights to test the continuity of individual conductors within a groundcord unit. The test set apparatus further includes the means to connect the headset unit to the test set apparatus and to apply power to the headset. An amplifier powered by the test set is coupled to a telephone jack to provide a test set operator with a self-check of the communications headset unit. Audio signals which are introduced into the headset unit microphone are amplified by the amplifier and returned to the earpiece speaker of the unit to check the headset for a malfunction.

It is one object of the present invention, therefore, to provide an improved headset/groundcord tester apparatus.

It is another object of the invention to provide an improved headset/groundcord tester apparatus to test the continuity of the individual conductors with the groundcord unit.

It is another object of the invention to provide an improved headset/groundcord tester apparatus to provide a visual indication of the individual conductor's continuity and to provide a multiple or plural visual indication when a particular conductor is shorted to other conductors within the groundcord unit.

It is yet another object of the invention to provide an improved headset/groundcord tester apparatus wherein the headset unit is tested to insure that the unit is operational.

These and other advantages, objects and features of the invention will become more apparent after considering the following description taken in conjunction with the illustrative embodiment in the accompanying drawings.

BRIEF DESCRIPTION OF THE DRAWINGS

The sole FIGURE is a schematic diagram of the groundcord/headset tester apparatus in accordance with the present invention.

DESCRIPTION OF THE PREFERRED EMBODIMENT

Referring now to the FIGURE, there is shown a headset/groundcord tester apparatus utilizing a power supply means 10 which receives its external power through an electric plug 12. The power supply means 10 supplies power to a plurality of indicator lights 14 through 18 and to amplifier unit 20 by means of rectifier 22. The test set apparatus includes male and female connectors 24, 26 to which the ground cord unit is connected. The connector 26 has a plurality of pins therein which are respectively connected to said plurality of indicator lights 14 through 18. A rotary wafer switch 28 is provided with a first and second wafer 28a and 28b. Wafer 28b has a plurality of pins therein which are connected to the wires from connector 24. The rotary arm on wafer 28b is connected to ground. Wafer 28a has a plurality of pins thereon which are wired to each other and to one side of the power supply means 10. The center arm on wafer 28a is connected to one side of the electric plug 12. The headset/groundcord tester apparatus further includes a headset power light which is connected between the headset pin on wafer 28b and the power supply means 10. A test set power indicator light is connected between the power supply means 10 and ground to indicate when power is applied to the test set apparatus. A telephone jack 36 is utilized to attach the headset unit to the tester apparatus. When the headset unit is attached to the test set by means of jack 36, the headset unit is powered by amplifier 20. The test set operator may now speak into the mouthpiece of the headset unit and hear his speech in the earpiece of the unit if the headset unit is operational.

The headset/groundcord tester apparatus operates in the following manner: First, check that fuse 40 is good in order to insure the test set will operate and then plug the electrical connector into a 117 volt AC Power outlet. Prior to attaching either the headset unit or the ground cord, perform the selfcheck in the following manner: Rotate Selector Switch to the "test" position and observe that the ground cord power light 30 (green) is illuminated. If light does not come on, check to see that the fuse is good. If fuse is good check to see that the power outlet has 117 volts AC Power. Check each of indicator lights 14–18 by depressing each of the five light assemblies one at a time to insure that each light bulb will light. If light does not come on, replace light bulb.

The groundcord is tested in the following manner. At this point, however, it must be pointed out that the headset unit and the groundcord are tested separately and independently of each other by the present headset/groundcord tester apparatus. This portion of the description involves the testing of the groundcord only. Plug the groundcord 42 into connectors 24, 26. The male end of the groundcord 42 plugs into connector 26 and the female end of the groundcord 42 plugs into connector 24. Now rotate the selector switch on rotary switch 28 to position A (the green wire in groundcord 42) and observe that the green wire light 14 is illuminated. It should be noted that no other light is illuminated. If no light is illuminated, the green wire in groundcord is open. If any other light is illuminated, there is a short between the color wire whose light that is lighted and the green wire. Now rotate the selector switch on rotary switch 28 to position B and observe that the white wire light 15 is illuminated. It should be noted that no other light is illuminated. If no light is illuminated, the white wire in the groundcord is open. If any other light illuminates, there is a short between the color wire illuminated and the white wire. Rotate the selector switch on rotary switch 28 to position C and observe that the red wire light 16 is illuminated. If no light is illuminated, the red wire is open. If any other light illuminates, there is a short between the color wire whose light is illuminated and the red wire.

Rotate the selector switch on the rotary switch to position D (the yellow/black wires which includes the MIC Button switch) and observe that the black wire light 17 is illuminated. It should be noted that no other light is illuminated. If no light is illuminated, the black wire is open. If any other light illuminates there is a short between the color wire illuminated and the black wire. Now depress the MIC Button on the groundcord 42 and observe that "MIC Button" light 18 is illuminated along with the black wire light 17. It should be noted that no other light is illuminated. If no light illuminates besides the black wire light 17, then the yellow wire is open. If any other light illuminates there is a short between the color wire and the yellow wire.

In order to test the headset unit, it must be plugged into telephone jack 36. In this portion of the description, the test apparatus operation involves only the testing of the headset unit. Rotate the selector switch on the rotary switch 28 to the headset position, and observe that the headset power light 44 is illuminated. The testing person should position the headset unit on himself and speak into the mouthpiece. The tester should listen for speech in the earpiece. If no sound is heard through the earpiece then either the white wire or green wire is open. If a sound is heard but not the tester's voice then either the black wire or the red wire is open. If a squeal is heard than the red wire and the green wire are shorted. Thus, the test of the headset/groundcord unit is completed.

Although the invention has been described with reference to a particular embodiment, it will be understood to those skilled in the art that the invention is capable of a variety of alternative embodiments within the spirit and scope of the appended claims.

What is claimed is:

1. A headset/groundcord tester apparatus comprising in combination:
    an energizing means to provide an electrical signal,
    a plurality of indicating means each respectively connected to said energizing means,
    first and second connector means to respectively attach to said groundcord, said first connector means containing a plurality of connector pins therein, said connector pins being wired respectively to said plurality of indicating means, each of said connector pins respectively mating with one of a plurality of electrical conductors in said groundcord, said second connector means receiving the other end of said groundcord and providing electrical connectors for each of said electrical conductors in said groundcord, and,
    a switching means connected to said second connector means to provide a switchable signal return path for said electrical connectors, said switching means connected between said energizing means and said plurality of indicating means, said switching means switchably connecting each of said plurality of indicating means, said switching means providing electrical isolation between said second connector means and said plurality of indicating means, said switching means respectively applying said electrical signal to each of said plurality of electrical conductors in said groundcord while simultaneously providing a signal return path, each of said indicating means respectively indicating the state of each of said plurality of electrical conductors.

2. A headset/groundcord tester apparatus as described in claim 1 further including an amplifier means connected to said energizing means and a third connector means connected to said amplifier means to receive power signals therefrom, said headset being connected to said third connector means to receive the power signals therefrom, audio signals being applied to said headset to test the operation of said headset.

3. A headset/groundcord tester apparatus as described in claim 1 wherein said energizing means comprises an external source of AC power connected to a step down voltage transformer to provide said electrical signal.

4. A headset/groundcord tester apparatus as described in claim 1 wherin said signal return path is ground.

5. A headset/groundcord tester apparatus as described in claim 1 wherein said switching means comprises a multi-position two wafer rotary switch.

* * * * *